United States Patent [19]

Black et al.

[11] Patent Number: 4,942,540
[45] Date of Patent: Jul. 17, 1990

[54] METHOD AN APPARATUS FOR SPECIFICATION OF COMMUNICATION PARAMETERS

[75] Inventors: Darryl P. Black, Merrimack, N.H.; Elizabeth G. Ricci, Bedford, Mass.

[73] Assignee: Wang Laboratories, Inc., Lowell, Mass.

[21] Appl. No.: 20,838

[22] Filed: Mar. 2, 1987

[51] Int. Cl.$^5$ ............................................. G06F 3/04
[52] U.S. Cl. ........................................ 364/514; 379/96
[58] Field of Search ............... 364/300, 200, 900, 521, 364/514; 379/94, 106, 221, 96

[56] References Cited

U.S. PATENT DOCUMENTS

| | | | |
|---|---|---|---|
| 4,348,739 | 9/1982 | Deaver et al. | 364/900 |
| 4,611,277 | 9/1986 | Kemppainen et al. | 379/96 |
| 4,653,090 | 3/1987 | Hayden | 379/204 |
| 4,811,240 | 3/1989 | Ballou et al. | 364/424.1 |
| 4,839,829 | 6/1989 | Freedman | 379/96 |
| 4,866,758 | 9/1989 | Heinzelmann | 379/96 |

OTHER PUBLICATIONS

Brugsch; "Apple's New Modem and Access II"; Byte; Dec. 1984.
P Terminal & Version, Microsoft Windows, 1985.

Primary Examiner—Parshotam S. Lall
Assistant Examiner—Ellis B. Ramirez
Attorney, Agent, or Firm—Michael H. Shanahan; Scott K. Peterson

[57] ABSTRACT

A method and apparatus by which a user can enter and edit communication configuration parameters. A screen display includes a depiction of a communication connection and a scrollable list of communication parameter sets. The depiction of the connection includes a local system icon, an icon identifying a particular remote system, and a visual indication of other communication parameters. The depiction is updated to represent the current values of the currently selected set of communication parameters. Prompts to aid in entering and changing these parameters are presented in the context of the display of a the connection and the display of the communication parameter set list.

13 Claims, 7 Drawing Sheets

| SCREEN STATE | KEY | NEXT | COMMENTS/ADDITIONAL CONDITIONS |
|---|---|---|---|
| A LOCAL I | EXEC | ---B | |
|  | CANCEL | ---H | |
| B LOCAL II | EXEC | ---D | IF THERE ARE NO PARAMETER SETS YET DEFINED, AND IF MORE THAN ONE MODEM IS AVAILABLE. |
|  | EXEC | ---E | IF THERE ARE NO PARAMETER SETS YET DEFINED, AND IF ONLY ONE MODEM IS AVAILABLE. |
|  | EXEC | ---C | IF AT LEAST ONE PARAMETER SET IS DEFINED. |
|  | CANCEL | ---H | |
| C SCROLL | INSERT | ---D | IF MORE THAN ONE MODEM IS AVAILABLE. |
|  | INSERT | ---E | IF ONLY ONE MODEM IS AVAILABLE. |
|  | REPLC | ---F | |
|  | DELETE | ---G | |
|  | CANCEL | ---H | |
| D ADD I | INSERT | ---E | THE CONNECTION DEPICTED IS CHANGED. |
|  | EXEC | ---C | |
|  | CANCEL | ---C | DATABASE IS UNCHANGED. |
| E ADD II | EXEC | ---C | DATABASE IS UPDATED. |
|  | CANCEL | ---C | IF THE SCROLL LIST HAS AT LEAST ONE ENTRY. |
|  | CANCEL | ---H | IF THE SCROLL LIST IS EMPTY. |
| F MODIFY | EXEC | ---C | DATABASE IS UPDATED. |
|  | CANCEL | ---C | DATABASE IS UNCHANGED. |
| G DELETE | EXEC | ---C | IF THE SCROLL LIST HAS AT LEAST ONE ENTRY. |
|  | EXEC | ---D | IF THE SCROLL LIST IS EMPTY, AND IF MORE THAN ONE MODEM IS AVAILABLE. |
|  | EXEC | ---E | IF THE SCROLL LIST IS EMPTY, AND IF ONLY ONE MODEM IS AVAILABLE. |
|  | CANCEL | ---C | |
| H EXIT | | | |

FIG. 5

METHOD AN APPARATUS FOR SPECIFICATION OF COMMUNICATION PARAMETERS

FIELD OF THE INVENTION

The present invention relates to user interfaces for computer systems and to methods and apparatus for editing databases of communication configuration parameters.

BACKGROUND

Computer communications, like many other uses of computers, typically requires precise set up by a user. Before a task such as "send a message to the Chicago office" can be performed, much preparation is typically required, including the specification of various communication parameters. Such parameters might include the name of the particular Chicago computer system, an access password, its telephone number, the data rate at which its modem operates, and so forth.

The need for set up flows from the fact that communications systems are typically designed to be relatively flexible; they are designed to work with a range of different system configurations. Some configuration parameters can be automatically determined (e.g., the capabilities of a modem internal to the user's system). However, various aspects of a particular configuration to be used must be specified by a user.

The nature of the configuration information that a user must provide varies, depending upon the communications environment such as these examples: synchronous and asynchronous communications over switched lines can involve parameters such as data rate, telephone number, delay time between attempts to dial; network communications, both local area networks and wide area networks, can involve parameters such as system names and types, file transfer passwords, and system capabilities (e.g., types of transfers supported).

Configuration Databases and Their Modification

While sometimes communication configuration information is embodied implicitly in communications programs, more often such information is stored separate from the body of the program in a configuration database. The task of building and modifying a configuration database is done in various ways, such as:

(a) If the configuration database is stored as a text file, a general purpose text editor is used to edit the database. Since any existing text editor can be used, no special data entry program need be created. However, this has the disadvantage that while editing the database the user is not provided with any prompts or other database specific guidance.

(b) If the database is stored using a database subsystem, database data entry screens may be used. These are typically arranged so that each screen corresponds to a record in the database; each screen has fields to be filled in by the user, and these fields correspond to fields in the record to which the screen corresponds.

(c) A variation on approach (b) is where the data base is sufficiently simple that only a single screen is needed: after the user selects a parameter set to be modified, the current values of that set are displayed (such a display is sometimes called a settings sheet); the user moves the cursor around the screen and changes the parameters to the desired values. Rather than moving the cursor around the screen to change values, two other methods can be used:

(1) the user types commands to change individual values; or (2) the user is sequentially prompted to change or accept every parameter in the set.

(d) Another approach is to view database modification as a side effect of controlling a communication system. In this case a user issues network control commands which result in changes in a configuration database. The initial version of the database can be generated as part of a system generation procedure; in this case a user provides initial information by means of a text file or by responding to prompts during the generation process.

One shortcoming of these prior approaches is that they tend to divert the user's attention from the user's intended task of communicating. For example, approach (b) above diverts the user's attention to the task of specifying communication parameters, and the task of specifying communication parameters is further diverted to the task of navigating through the data entry screens for a configuration database; thus, rather than directing attention to the user's initial problem, the user is diverted to a "database problem". Also, the user can easily get lost when deeply embedded in nested menus. Another form of diversion of the user's attention, especially seen in approaches (a) and (d), occurs when the user's attention becomes focused on remembering a vocabulary of command verbs and remembering the command syntax in which these must be used. This problem is aggravated when approach (a) is used because the probability of typing errors is great and the user must prepare a properly spelled and formatted file.

An object of the present invention is to provide means by which a user can, with little concern for communications details, easily specify needed communication parameters.

SUMMARY OF THE INVENTION

According to the present invention, a display is presented to a user that helps the user understand the context in which requested information is relevant. The user's system (also referred to as the local system) is depicted on the screen. Another system is also depicted, along with a visual indication of a connection to the user's system. Thus, the screen display reminds the user that the task being addressed is communication between the user's system and some other system. The meaning of some communication parameters are visually depicted, aiding the user in understanding and remembering the significance of these parameter settings. A list of parameter sets is displayed in a portion of the screen so as not to obscure the depiction. The depiction is updated to represent the current values of the currently selected set of parameters. When parameters are being entered or changed, the context in which the prompts are presented enhances the meaning of the prompts.

BRIEF DESCRIPTION OF THE DRAWING

The invention is pointed out with particularity in the appended claims The above and other advantages of the invention may be better understood by referring to the following detailed description in conjunction with the drawing, in which:

FIG. 5 is a state transition table showing the relationship between certain user keystrokes and major display events;

DETAILED DESCRIPTION OF AN ILLUSTRATIVE EMBODIMENT

A computer program known as a configuration editor is used in practicing the present invention. This program runs on a general purpose computer system (such as the Wang LapTop computer) and a user interacts with the system by use of a keyboard and a display screen. This computer system is known as the local computer system that is to be involved in communication with one or more remote systems. The configuration editor is used to create and modify a database that is used by various communications facilities such as file transfer and terminal emulation according to various predefined protocols that are part of a collection known as Wang Systems Networking.

I. Usage

FIGS. 1-4, show examples of the screen display at various times during the operation of an illustrative configuration editor. The configuration editor initially displays previously defined information and collects new information and modifications from the user about the local system's communication environment. The editor then enters a scroll mode which enables the user to review previously collected information about remote systems, modify this information, and enter new information about remote systems.

Figure 1:
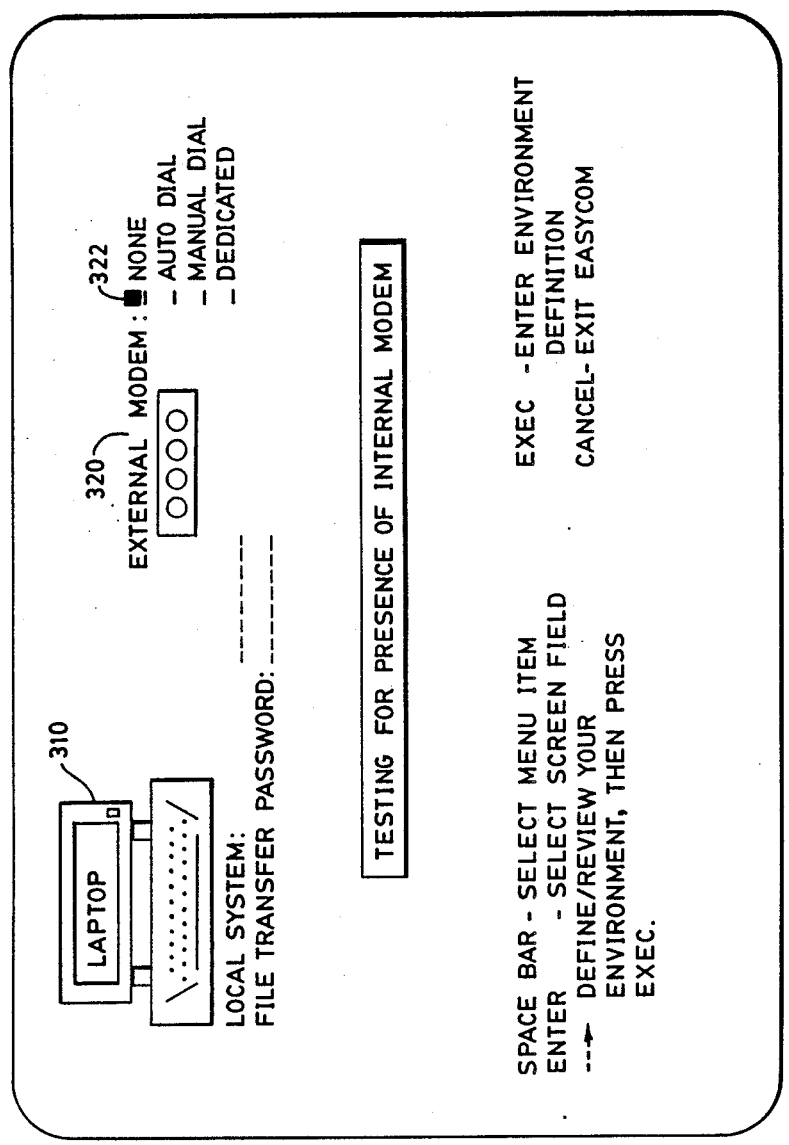
FIGS. 1, 2, 3, and 4 show various screen displays produced by an illustrative configuration editor according to the present invention.

When the configuration editor is started on a system that has no existing communications configuration database, the user is presented with a screen display as shown in FIG. 1. When the editor is started on subsequent occasions (i.e., when there is an existing database), a display like in FIG. 1 is displayed that includes whatever values are present in the database for the displayed fields; in other words, the relevant information from that database would be displayed in place of the blanks shown in FIG. 1 and the selection block 322 would be set to the selection indicated in the database.

On this initial screen, a message is displayed indicating that the local system is being tested to determine if an internal modem is present in the system. The automatic detection of an internal modem is an example of how the illustrative configuration editor, where possible, automatically acquires information. Another example of automatic acquisition of information is where the local system is actively connected to a communications network, in which case it is possible to acquire information about the other systems actively connected to the network. Having acquired information automatically, the editor need not prompt the user for this information. It may be possible to detect an externally connected modem. However, in this illustrative embodiment the user is prompted to enter information about an external modem, rather than gathering such information automatically. This is because external modems are so easily changed (especially if the local system is a portable computer); also, in this way, configuration can be performed at a time when the external modem is not plugged in.

On the initial screen, shown in FIG. 1, is depicted the user's local system 310 and an external modem 320. The screen includes three data entry fields: a local system name, a password to be used by remote systems seeking to transfer files with the local system, and an external modem specification. The user can move among the fields by pressing the ENTER key. The first two fields are fill in fields, into which the user enters text. The third field is a multiple choice field: a selection block 322 (shown in FIG. 1 selecting "None") can be moved by the user (by use of the space bar, or the first letter of a selection) among the selections. When the contents of all three of these fields is acceptable to the user, the user presses the EXEC key.

Figure 2:
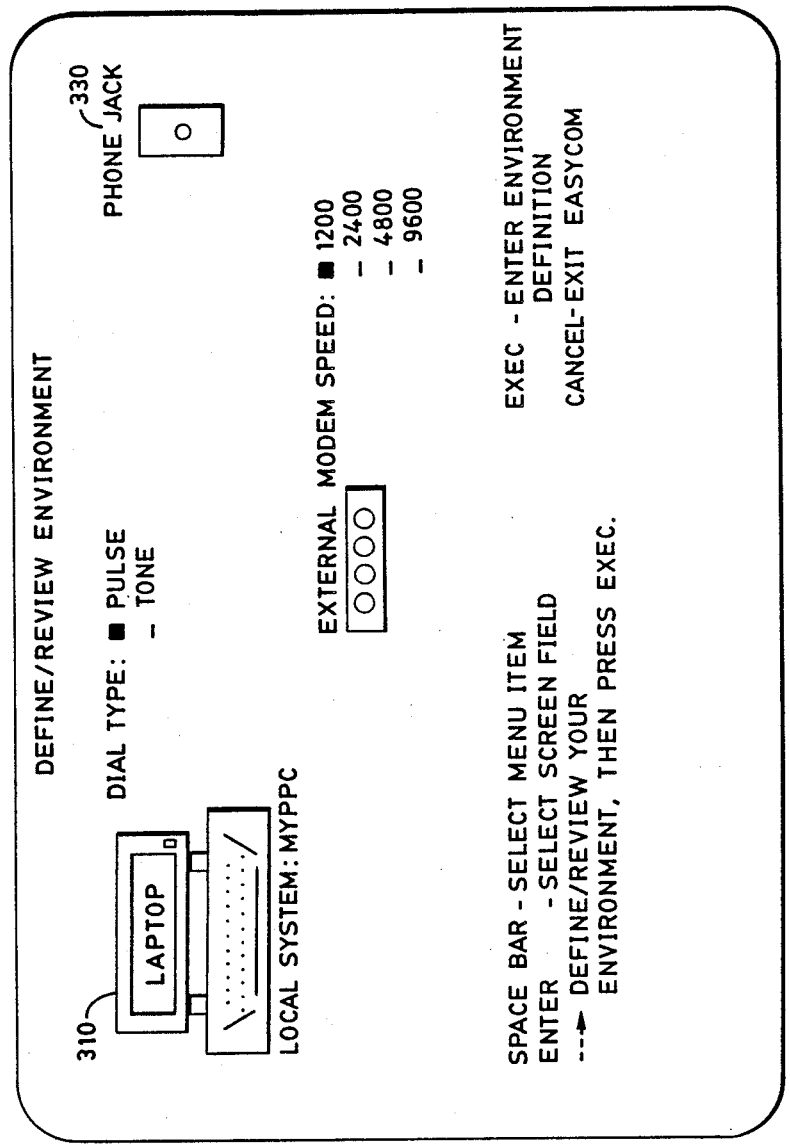

In response to the user pressing the EXEC key at the initial screen, the screen display is modified in ways that depend on the information remaining to be collected regarding the local system. If there is an external auto dial modem then the user is prompted for further information about the local system environment as shown in FIG. 2: dial type (pulse or tone) (a property of the telephone exchange to which the user's telephone line is connected) and maximum speed of the external modem. If there is only an internal modem whose characteristics have been automatically detected, then the only further information about the local system for which the user is prompted is the dial type (assuming the internal modem is determined to have auto-dial capability).

A characteristic of the present system is that the prompts presented to the user are adjusted in light of previously acquired information. For example, if there is only a manual dial modem, then when defining the local environment the user is not prompted for the dial type (pulse or tone) and when defining a remote system the user is not prompted for telephone number.

Figure 3:
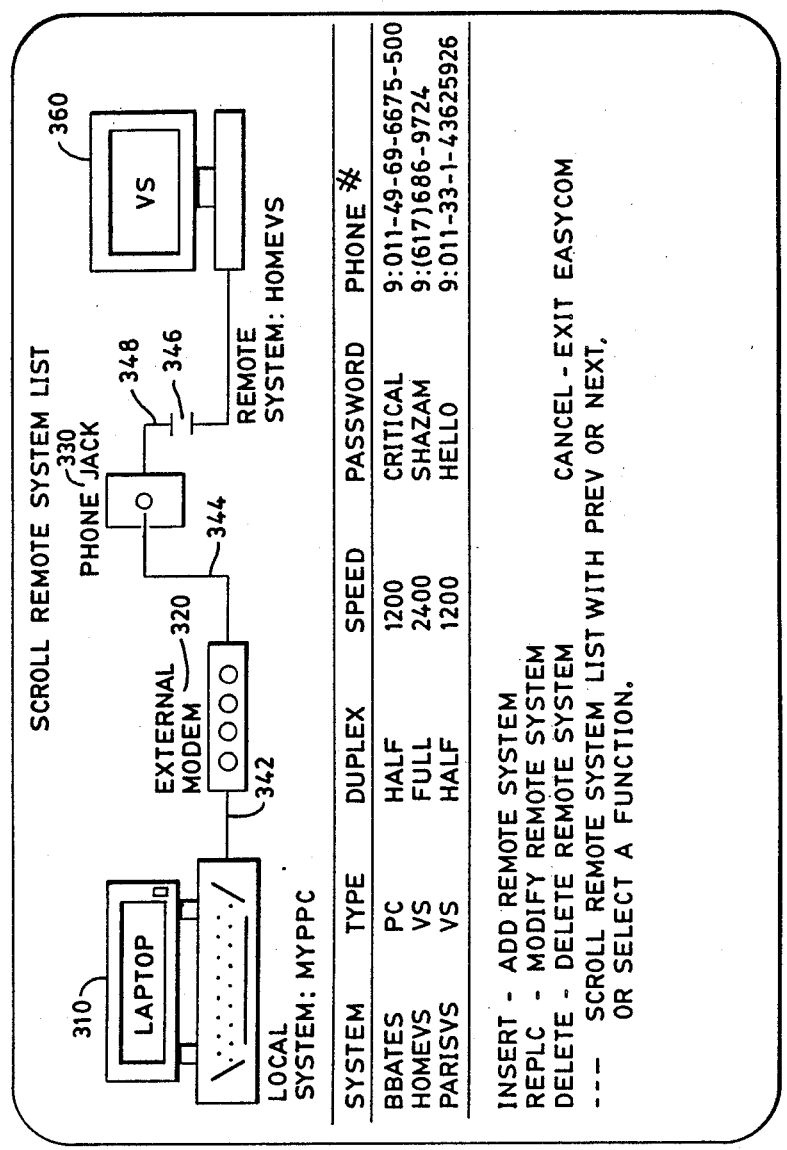

In response to pressing the EXEC key at the screen of FIG. 2, a screen like that shown in FIG. 3 is displayed. This screen indicates to the user that the editor is in scroll mode. In scroll mode the user can scroll the list of information about remote systems (by use of arrow keys or PREV and NEXT keys) and the user can branch to insert, delete, or modify operations (by other key presses, described below). In the present example, the communication parameters are organized for the user into sets according to remote systems—i.e., each set includes parameters for connecting to a particular remote system. One of the parameter sets in the list is the currently selected set; by scrolling through the list, the user can make any one of the sets the current selection.

The scroll screen, shown in FIG. 3, includes a window in which is displayed information from up to three sets of communication parameters. The user can see information about all of the existing parameter sets by scrolling through this list. The current selection from the list is emphasized by being displayed in reverse video or other in another way visually highlighted; thus, in scroll mode, the connection depicted always corresponds to the current selection from the list.

The scroll screen also depicts the local system 310, a remote system 360, and a connection 342, 320, 344, 330, and 348 to this remote system. The remote system and connection depicted corresponds to the current selection from the scrollable list. Specifically, in FIG. 3, the connection is depicted including an external modem 320 and a phone jack 330 and communication lines from the local system to the modem 342, from the modem to the phone jack 344, and (with distance indicated by a break in the line bounded by parallel bars 346) from the phone jack to the remote system. If the current parameter set in the scrollable list specified use of an internal modem, then the internal modem would be depicted and a connection from the internal modem to the phone jack would be depicted in place of connections from the local system to the external modem and from the external modem to the phone jack. Changes in the current selection results in updating the depiction of the connection and the remote system.

From this screen (FIG. 3), by pressing the appropriate key the user can elect to modify one of the existing parameter sets (the REPLC key), create a new parameter set (the INSERT key), delete a parameter set (the DELETE key), or exit from the configuration editor (the CANCEL key).

When the DELETE key is pressed, the user is asked whether or not the parameter set represented by the current selection from the scrollable list is to be deleted from the configuration database. If the user confirms this, then the configuration editor modifies the database.

Figure 4:
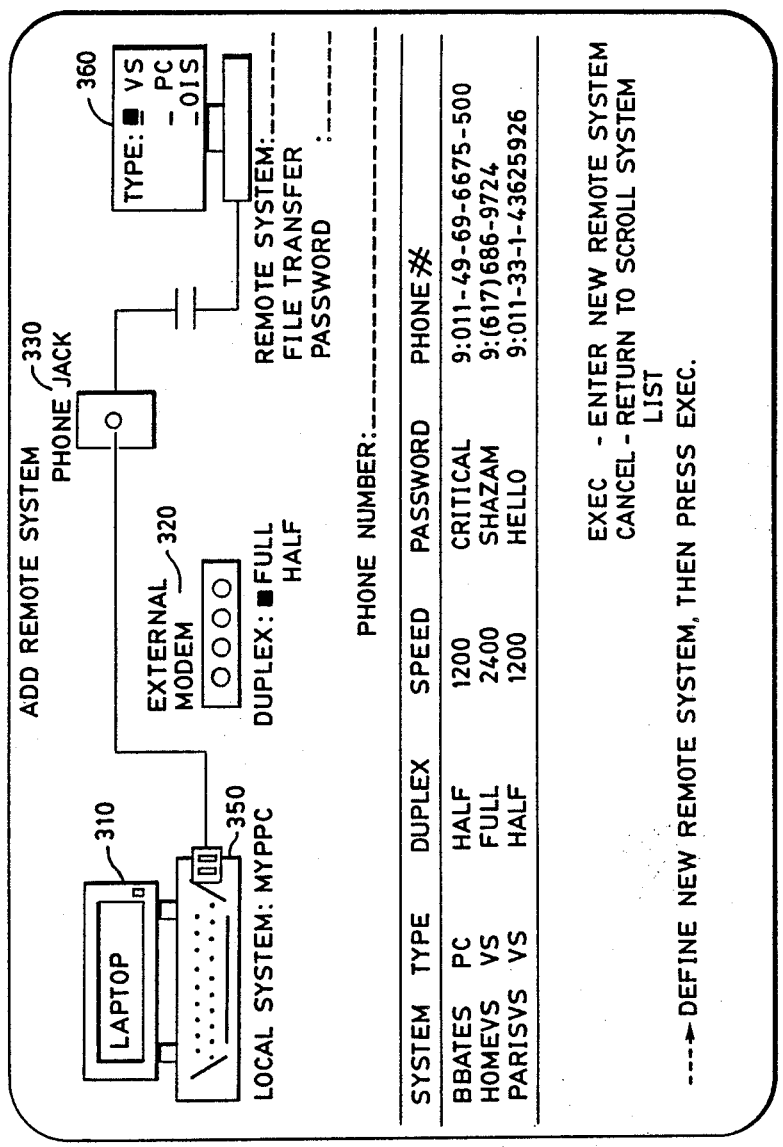

When the INSERT key is pressed, a screen somewhat like that shown in FIG. 4 is displayed; the multiple choice field "Duplex" and the fill-in fields "Remote System", "File Transfer Password", and "Phone Number" would not yet be displayed. (Also, if the INSERT key was pressed at the screen exactly as shown in FIG. 3, then the connection depicted would go via the external modem 320, rather than the internal modem 350, because that was the current connection shown.) At this point pressing the INSERT key switches the depicted connection among the available alternatives: because in the present example there are only two types of connections (via the internal modem or via the external modem), the INSERT key has a toggling action; if more than two connections were available then repeated pressing of the INSERT key would sequentially step through each of the possible connections. When the desired connection is depicted, the user presses the EXEC key. At this time, fields for additional information are displayed, as shown in FIG. 4 (e.g., "Duplex", "Remote System", "File Transfer Password", and "Phone Number"). After the user is satisfied with the information entered in these fields, the user presses the EXEC key resulting in the addition of information to the configuration database corresponding to the parameters just entered.

When the REPLC key is pressed at a screen like that of FIG. 3, then a screen similar to that of FIG. 4 is displayed in which the fields are filled with the values from the current parameter set and the connection shown corresponds to that specified in the current parameter set. The user can modify the values displayed in the various fields and then press the EXEC key to cause the modifications to be incorporated into the configuration database. In the illustrative editor, the type of connection (i.e., via internal or external modem) cannot be changed; thus during the modify operation there is no screen corresponding to Add I in FIG. 5.

I.A. Some Screen Characteristics

What has been discussed above as a series of screens (examples of which are shown in FIGS. 1-4) could also be understood to be a single evolving screen. For example, the depiction of the local system is always present on the screen in the same location; in fact, once on the screen, the local system depiction need not be redrawn. Other parts of the depiction of the communications connection and remote system generally stay on the screen, too.

Another characteristic of the screen display is a fixed size window at the bottom of the screen in which is displayed helpful information about what actions ar currently bound to selected keys and a statement of the type of action the configuration editor expects the user is currently taking. At the top of the screen is a heading that also provides helpful information about the current state of the configuration editor.

I.B. Screen Flow

FIG. 5 summarizes the relationship between key strokes and screen display in a table having four columns, which are titled:
(a) SCREEN STATE,
(b) KEY,
(c) NEXT,
(d) COMMENTS / ADDITIONAL CONDITIONS.

In the first column are listed the major screen states. In the second column are listed keys that a user can press; in the second column a group of keys are listed for each of the screen states in the first column. In the third column are listed the next screen state that results from the user pressing the corresponding key indicated in the second column. In some cases a particular key can result in one of several possible screen states, depending upon some further condition; such further conditions are identified in the fourth column of the table. The fourth column also includes some comments about actions that are taken in addition to changing the state of the screen display.

Figure 6:
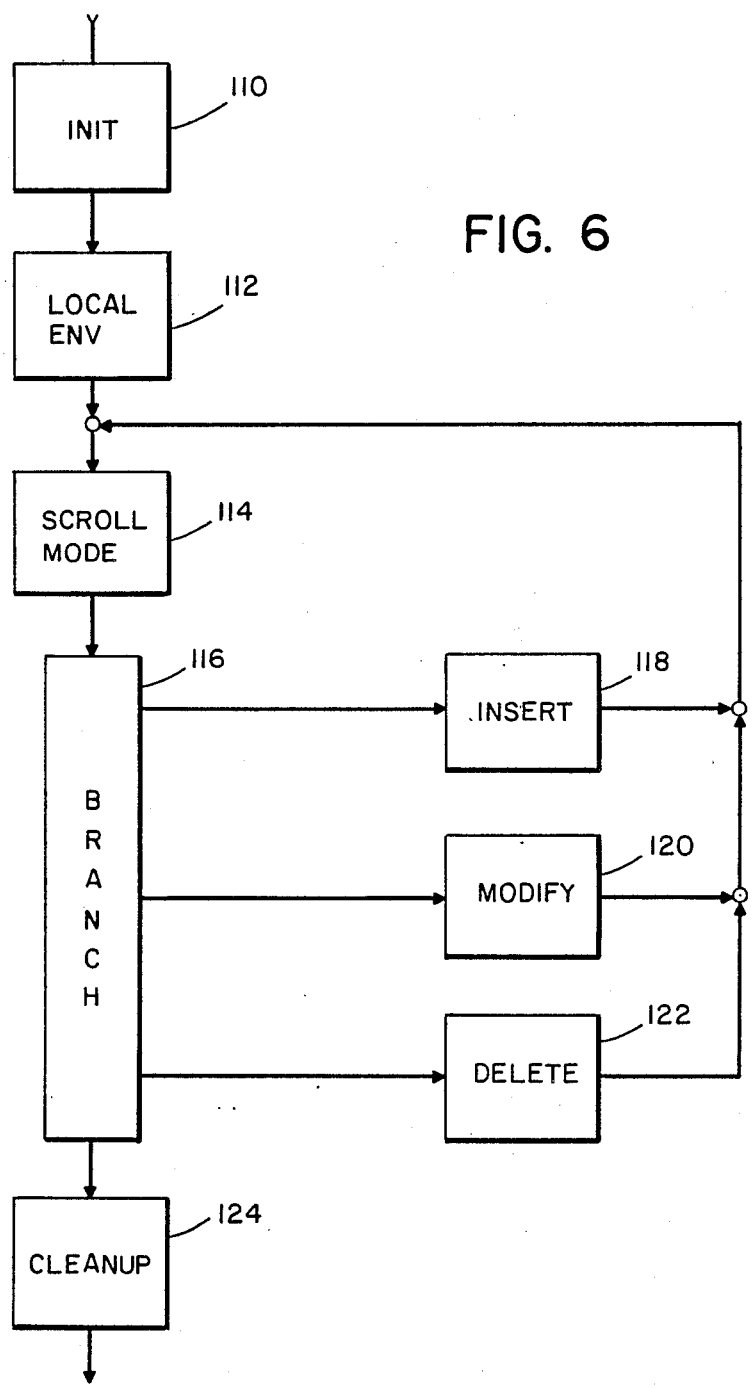
FIG. 6 is a flow chart showing the sequence of operations of the configuration editor.

The screen displays shown in the FIGS. 1-4 correspond to screen states in the table of FIG. 5 as follows:
FIG. 1 is Local I
FIG. 2 is Local II
FIG. 3 is Scroll
FIG. 4 is Add II II. IMPLEMENTATION II.A. Flow Chart FIG. 6 is a flow chart that shows the high level sequencing of the illustrative configuration editor. When the configuration editor is started, initialization activities 110 are performed. Following initialization 110, a series of steps 112 are performed by which the user can enter and edit information describing communication parameters of the local system (i.e., the local system's communication environment).

After entry of local information 112, scroll mode 114 is entered. Scroll mode 114 permits a user to scan a list of different sets of communication parameters and to make any one of these the current set. Scroll mode 114 is exited when the user presses one of four keys: INSERT key, DELETE key, REPLACE key, or CANCEL key. Following such a key press, branching 116 occurs that directs further processing to one of four operations, depending upon which key was pressed:
INSERT KEY→insert operation 118
REPLACE key→modify operation 120
DELETE key→delete operation 122
CANCEL key→cleanup operation 124

The operations 118, 120, and 122 permit a user to create a new parameter set and add it to the list, modify a listed parameter set, and delete a listed parameter set, respectively. The cleanup operation 124 makes preparations for exiting the configuration editor.

II.B. Internal Organization

The software implementing the editor is written predominantly in the C programming language, with portions being written in 8086 assembly language.

Figure 7:
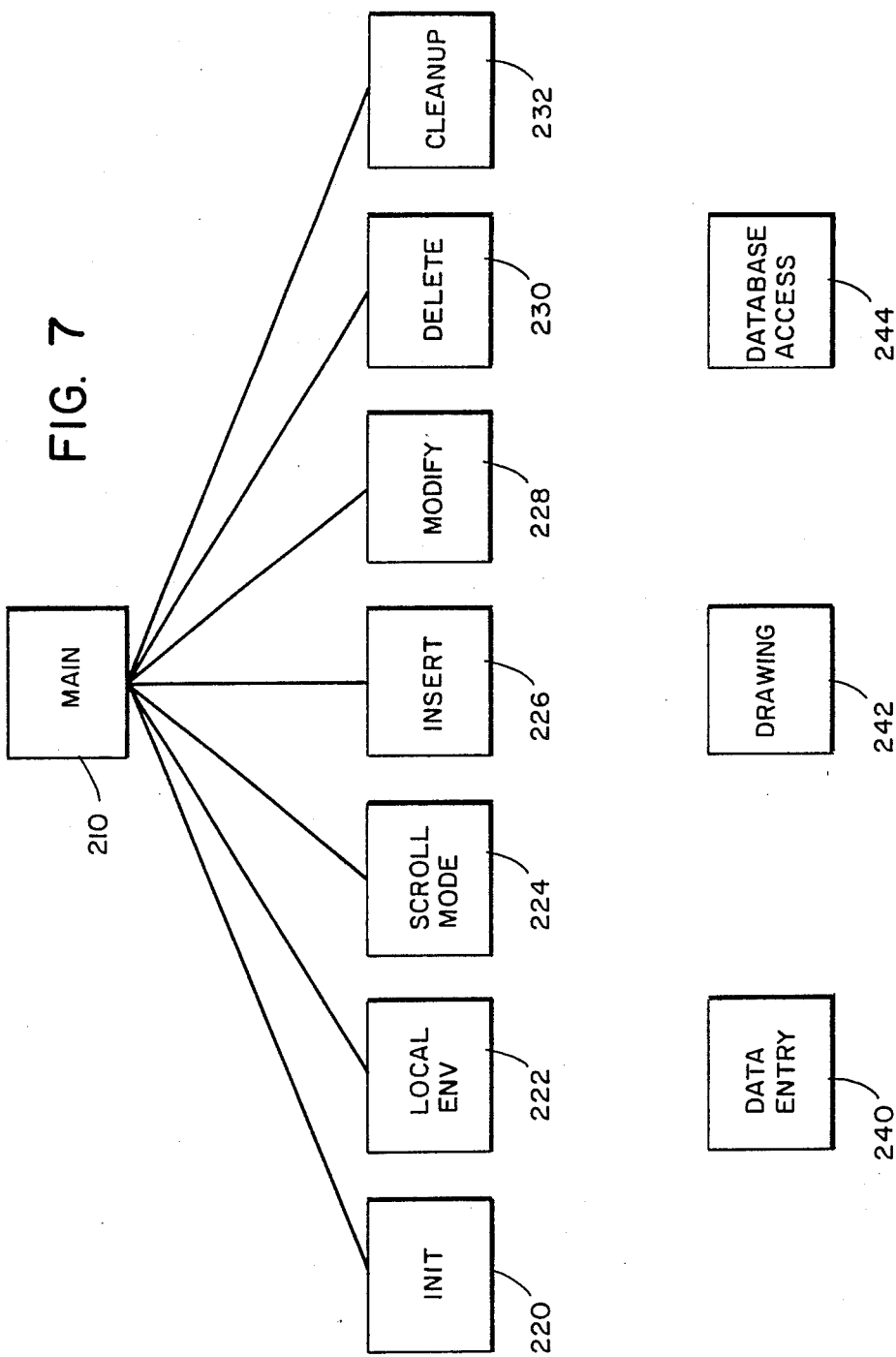
FIG. 7 shows major components of software implementing the configuration editor.

FIG. 7 shows major software components of the illustrative configuration editor. A module known as "main" 210 is highest level of the editor software. The main module 210 employs a set of second level modules 220, 222, 224, 226, 228, 230, and 232 to accomplish the operations indicated in the boxes 110, 112, 114, 118, 120, 122, and 124, respectively, of flow chart shown in FIG. 6; box 116 is directly implemented in main 210. These second level modules in turn rely on numerous lower level routines in accomplishing their operations. The lower level routines most important in understanding the present invention are organized into three groups: data entry primitives 240, drawing primitives 242, and database access primitives 244.

In the illustrative configuration editor, communication parameters are grouped into those describing the local communications environment (e.g., what type of modem the local system has available) and those needed to access particular remote systems. As far as the user is concerned, those needed to access particular remote systems are organized by remote system; these are organized for the user by the name of the remote system to which they apply. The configuration editor presents to the user a scrollable list with one entry in the list per remote system. For the convenience of the user, this list is sorted alphabetically by remote system name.

The illustrative editor does not provide means by which a user can control most of the individual details of the configuration database. This editor is intended to be usable by someone who is unsophisticated with regard to data communications technology. Thus, major alternatives are presented, and as many details as possible are hidden from the user and given values automatically generated by the editor. The vast majority of communication protocol parameters to be stored in the database will be determined by the configuration editor on the basis of that small amount of information entered by the user and automatically determined.

The data entry primitives 240 include routines for displaying messages at any location on the screen as well as for managing screen oriented data entry. Screen oriented data entry includes displaying the prompts for various data fields and providing for the user to move the cursor from field to field and change the value of each field. Two principle types of fields are supported: fill-in fields and multiple choice fields. Also provided are means by which different data validation operations can be performed for each of the fields.

The graphics primitives 242 are used to display the various depictions presented to the user. These primitives work on a character only display. This is possible by using graphics characters provided in the character set (that provide, e.g., horizontal and vertical lines and corners for connecting these) as well as exploiting the graphical character of normal characters. Further, display attributes such as reverse video and underline are exploited as well. For example, period characters in reverse video are used in depicting the external modem, and underlined colons are used in depicting the keyboards of the local and remote systems.

The graphics primitives 242 include very low level operations such as those that draw or erase vertical and horizontal lines. The graphics primitives also provide higher level operations such as those that draw pictures of computer workstations or draw an internal or external modem.

The graphics primitives 242 display text in addition to graphics. For example, the depiction of the local system includes a graphical representation of a Wang LapTop computer together with the phrase "Wang LapTop". (Note that a way to show a screen portion of a display using characters only is to display "Wang LapTop" in reverse video with reverse video spaces on both sides so as to form a rectangular region of reverse video; the FIGS. 1-4 do not show this reverse video.) In some cases the text portion of a depiction is displayed using the message display routines of the data entry primitives 24 (e.g., the system type indication on the screen of the remote system).

The database primitives 244 include routines that create, update, delete, and access (locate information) records in the configuration database.

III. CONFIGURATION DATABASE

The configuration database stores information about the local system, remote systems, and about protocols for communicating with remote systems. This is accomplished by storing data in records of a variety of types. One can think of this either as each record including a field that identifies the type of the record or the records being stored in a plurality of logical tables, with one table for each record type. The detailed implementation of the database is hidden from the higher level software by the database primitives.

The illustrative configuration database includes the following types of records (illustrative fields are listed for each type of record):

I. LOCAL SYSTEM NAME is a single record that stores the name of the local system:
    (A) name of the local system II. ENVIRONMENT RECORDS store information about the local system that may be protocol specific. The number of these records may range from zero to the total number of protocols defined:
    (A) protocol type
    (B) rate to use with an external modem
    (C) rate to use with an internal modem
    (D) dial type—e.g., pulse or tone
    (E) external modem type—e.g., none, auto dial, manual dial
    (F) internal modem type—e.g., none, auto dial, manual dial
    (G) external modem—Has there ever been an external modem?
    (H) internal modem—Has there ever been an internal modem?

III. SYSTEM RECORDS with one record for each remote system defined in the database. These are organized by system name:
    (A) name of remote system
    (B) remote system identifier
    (C) type of remote system
    (D) password to access the remote system IV. INDEX TO THE SYSTEM RECORDS. These records are organized by remote system identifier, rather than remote system name:
    (A) remote system identifier
    (B) name of remote system V. PROTOCOL RECORDS with one record for each protocol defined in the database. These are organized by protocol identifier:

(A) protocol identifier
(B) protocol name
(C) protocol type—e.g., synchronous, asynchronous, X.21, Telenet
(D) port address—slot with interface board and port # on the board
(E) enabled—permits protocol to be disabled without removing its definition from the database
(F) base cost of the protocol—for use in routing
(G) link type—e.g, switched, dedicated, leased
(H) role—e.g., primary/secondary or peer-to-peer
(I) modem rate
(J) modem option—e.g., full duplex, half duplex
(K) call direction—e.g., in, out, both
(L) inbound packet size—e.g., 128, 256, 512
(M) outbound packet size—e.g., 128, 256, 512
(N) parameter negotiate—yes or no
(O) sync character—e.g., hex 16
(P) stop bits—e.g., 1, 1.5, 2
(Q) parity enable—e.g., yes or no
(R) parity type—e.g., even, odd
(S) retry count for redialing
(T) delay time between retries VI. INDEX TO THE PROTOCOL RECORDS, organized by protocol name:
(A) protocol name
(B) protocol identifier VII. SYSTEM/PROTOCOL LINK RECORDS each indicate that a particular protocol is defined for use by a particular remote system. These are organized by remote system name:
(A) remote system name
(B) protocol name VIII. SYSTEM SPECIFIC PROTOCOL DATA with one record for each system/protocol pair that is defined. Contains the same number of records as there are system/protocol link records:
(A) protocol identifier
(B) remote system identifier
(C) protocol specific data such as:
  (a) telephone number
  (b) override—defaults overridden if true
  (c) retry count for redialing
  (d) delay time between retries
  (e) modem rate
  (f) modem option—e.g., full duplex, half duplex
  (g) use internal or external modem
  (h) autodial—e.g., autodial. manual dial, null modem Other information can be stored in such a database, such as: information about networks; information to support routing of data between systems which have no direct connection to each other; database control information, such as database version number.

Note that there is not a one to-one correspondence between records in the database and parameter sets in the scrollable list seen by the user: each parameter set in the list seen by the user includes a single remote system and a single protocol; in the database, a single System Record may be linked to a plurality of Protocol Records. Thus, certain logic is necessary when deleting what the user sees as a single parameter set. For example, when a selection in the scrollable list is deleted, the database is checked to see if there are any other protocols linked to the relevant remote system, and the affected System Record is deleted only if there are no other protocols defined for that system.

IV. VARIATIONS Variations

The present invention has been described in the context of point-to-point dial up communications. The invention can also be employed in other communications environments, such as local area networks. When connected to certain local area networks, the configuration editor can automatically update the scrollable list to indicate which remote systems are currently connected to the network. In this situation the configuration editor would not permit the user to delete automatically identified remote systems; if a remote system becomes inactive and ceases to be automatically detected, then the user would be permitted to delete that system from the list.

In some situations and for some types of users it may be advantageous to permit the user to select among a variety of communication protocols. For example, this can be accommodated at the screen state referred to above as Add I: repeated pressing of the INSERT key can cycle through a list of different protocols; the depiction of the connection can be augmented to visually distinguish among the different possible protocols.

In addition to aiding in the specification of communication parameters, the present invention can be used advantageously in accomplishing the communications operations themselves. For example, file transfer operations can be accomplished with the aid of a screen similar to that described above in the context of scroll mode. Such a screen can depict the local system, a remote system, and a connection between, and can have a window for a scrollable list; in this case the scrollable list can be a list of file transfer requests or a list of files available to be transferred. The depiction can be augmented with arrows to visually depict the direction of file transfer selected by the user. Such a file transfer arrangement can be made available to the user after the scroll mode screen or could be made available completely separate from the configuration editor.

The foregoing description has been limited to a specific embodiment of the invention. Additional advantages and modifications will be apparent to those skilled in the art. The invention is, therefore, not limited to the specific details, representative apparatus, and illustrative example shown and described in this specification. Rather, it is the object of the appended claims to cover all such variations and modifications as come within the true spirit and scope of the invention.

What is claimed as new and desired to be secured by Letters Patent of the United States is:

1. A communication parameter editor for use by a user to specify parameters for communication over a communication connection between a local system and a remote system, the editor comprising:
   (A) means for prompting for and receiving specifications of communication parameters from the user and
   (B) means responsive to the means for prompting and receiving for
      (1) displaying, during the prompting for communication parameters, a depiction of the local system, the remote system, and the communication connection therebetween that indicates the value of at least on communication parameter, and
      (2) updating said depiction when the value of said one communication parameter changes.

2. The communication parameter editor of claim 1 in which the depiction is displayed by means of character-cell graphics.

3. The communication parameter editor of claim 1 wherein the means for displaying and updating provides for a display that is switchable between at least two connection displays, and wherein the means for prompting and receiving provides for entry of information by the user's selection of one of the alternative connection displays.

4. The communication parameter editor of claim 1 further comprising configuration determination means for, under some circumstances, automatically determining information indicative of at least one communication parameter and, under other circumstances, not being able to determine that information, and wherein said means for prompting does not prompt a user for a parameter that has been automatically determined and does prompt a user for such parameter in those circumstances when the parameter has not been automatically determined.

5. The communication parameter editor of claim 1 wherein the displaying occurs on a display screen, the communication parameter editor further comprising list means for displaying in a region of the display screen a scrollable list of communication parameter sets any one of which can be the currently selected set and wherein the depiction means is responsive to the list means to adjust the depiction to correspond to the currently selected communication parameter set.

6. The communication parameter editor of claim 5 wherein the region of the display screen in which the list is displayed is fixed in location and in size.

7. The communication parameter editor of claim 6 wherein each parameter set of the list corresponds to a communication connection to a single remote system.

8. A method of collecting information, from a user of a local system, indicative of parameters relating to communication between the local system and at least one remote system, the method comprising:
  (A) displaying a depiction of a local system;
  (B) prompting for and receiving from the user information about the local system;
  (C) updating the display of the local system to illustrate at least some of the received local system information;
  (D) displaying a depiction of a generic remote system and displaying a connection to the local system;
  (E) prompting for and receiving from the user information about a particular remote system and a communication connection thereto;
  (F) updating the display of the local system, the remote system, and the connection therebetween to illustrate at least some of the received information.

9. The method of claim 8 further comprising the step of automatically determining a value for at least one communication parameter, and wherein the last updating step results in a display that manifests the automatically determined parameter.

10. A method by which a user edits communication parameters, the method comprising:
  (A) displaying in one region of a display screen a portion of a list of communication parameter sets, one of which is visually indicated as being a selected communication set, and displaying in another region of the display screen a depiction of at least some of the characteristics of communication according to the selected communication parameter set;
  (B) the user selecting a different communication parameter set;
  (C) updating the depiction to correspond to the different selected communication parameter set;
  (D) the user indicating that one or more of the parameters of the currently selected set are to be changed;
  (E) prompting for and receiving information from the user about a change to be made in the selected communication parameter set;
  (F) changing the communication parameter set according to the received information;
  (G) updating the depiction to correspond to the changed communication parameter set.

11. The method of claim 10 wherein the depiction includes an icon representing a local system, an icon representing a remote system, and a graphical indication of a connection therebetween.

12. The method of claim 11 wherein the icon representing the local system and a portion of the displayed list of parameter sets remain visible during the prompting.

13. A system for use by a user to edit communication parameters, the system comprising:
  (A) means for displaying in one region of a display screen a portion of a list of communication parameter sets, one of which is visually indicated as being a selected communication set, and displaying in another region of the display screen a depiction of at least some of the characteristics of communication according to the selected communication parameter set;
  (B) means by which the user can make any selected one of the set the current set;
  (C) means for updating the depiction to correspond to the current set;
  (D) means by which the user can indicate that one or more of the parameters of the current set are to be changed;
  (E) means for prompting for and receiving information from the user about a change to be made in the selected communication parameter set;
  (F) means for changing the communication parameter set according to the received information;
  (G) means for updating the depiction to correspond to the changed communication parameter set.

* * * * *

UNITED STATES PATENT AND TRADEMARK OFFICE
CERTIFICATE OF CORRECTION

PATENT NO. : 4,942,540  
DATED : July 17, 1990  
INVENTOR(S) : Black et al.

It is certified that error appears in the above-identified patent and that said Letters Patent is hereby corrected as shown below:

<u>Title page,</u>
Item [54], after "METHOD" delete "AN" and replace with -- AND --

Signed and Sealed this

Nineteenth Day of March, 2002

Attest:

JAMES E. ROGAN  
*Director of the United States Patent and Trademark Office*

*Attesting Officer*